(12) United States Patent
Yu et al.

(10) Patent No.: US 12,127,208 B2
(45) Date of Patent: Oct. 22, 2024

(54) METHOD AND APPARATUS FOR SCHEDULING A SIDELINK RESOURCE

(71) Applicant: LENOVO (BEIJING) LIMITED, Beijing (CN)

(72) Inventors: Xiaodong Yu, Beijing (CN); Zhennian Sun, Beijing (CN); Haipeng Lei, Beijing (CN); Lianhai Wu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 523 days.

(21) Appl. No.: 17/280,071

(22) PCT Filed: Dec. 20, 2018

(86) PCT No.: PCT/CN2018/122421
§ 371 (c)(1),
(2) Date: Mar. 25, 2021

(87) PCT Pub. No.: WO2020/124501
PCT Pub. Date: Jun. 25, 2020

(65) Prior Publication Data
US 2021/0345396 A1    Nov. 4, 2021

(51) Int. Cl.
*H04W 72/23* (2023.01)
*H04W 72/044* (2023.01)
*H04W 92/18* (2009.01)

(52) U.S. Cl.
CPC ....... *H04W 72/23* (2023.01); *H04W 72/0473* (2013.01); *H04W 92/18* (2013.01)

(58) Field of Classification Search
CPC .. H04W 72/23; H04W 72/0473; H04W 92/18
See application file for complete search history.

(56) References Cited

U.S. PATENT DOCUMENTS 11,497,036 B2 * 11/2022 Xue .................... H04W 72/121
2016/0219620 A1    7/2016 Lee et al.
(Continued)

FOREIGN PATENT DOCUMENTS

| CN | 106612561 A | 5/2017 |
| CN | 107852727 A | 3/2018 |

(Continued)

OTHER PUBLICATIONS

International Searching Authority, "Notification of Transmittal of the International Search Report and the Written Opinion of the International Searching Authority, or the Declaration", PCT/CN2018/122421, Dec. 20, 2018, pp. 1-6.
(Continued)

*Primary Examiner* — Deepa Belur
(74) *Attorney, Agent, or Firm* — Kunzler Bean & Adamson

(57) ABSTRACT

The subject application is related to a method and apparatus for scheduling a sidelink resource. A method for transmitting data includes: transmitting sidelink control information (SCI), wherein the SCI is used to request a grant of transmitting data, wherein the SCI comprises a recommended resource which can be utilized to transmit the data; receiving another SCI from a UE for scheduling; and transmitting the data corresponding to the received another SCI.

20 Claims, 5 Drawing Sheets

(56) References Cited

U.S. PATENT DOCUMENTS

| | | | |
|---|---|---|---|
| 2017/0238260 A1* | 8/2017 | Kim | H04L 5/0094 |
| | | | 455/522 |
| 2018/0324882 A1* | 11/2018 | Gulati | H04W 72/23 |
| 2020/0092692 A1* | 3/2020 | Wang | H04W 76/14 |
| 2020/0344808 A1* | 10/2020 | Ku | H04W 4/06 |
| 2021/0022084 A1* | 1/2021 | Jiang | H04W 52/383 |
| 2021/0377927 A1* | 12/2021 | Kusashima | H04W 72/20 |
| 2021/0409990 A1* | 12/2021 | Wang | H04W 24/10 |
| 2022/0394813 A1* | 12/2022 | Liu | H04W 76/28 |
| 2024/0080769 A1* | 3/2024 | Ryu | H04W 52/0232 |

FOREIGN PATENT DOCUMENTS

| | | | | |
|---|---|---|---|---|
| WO | WO-2017067503 A1 * | 4/2017 | | H04W 72/12 |
| WO | 2018204131 A1 | 11/2018 | | |

OTHER PUBLICATIONS

3GPP, 3rd Generation Partnership Project; Technical Specification Group Radio Access Network; Sidelink Resource Allocation in V2X, 3GPP R2-161566, Feb. 2016, pp. 1-10.

3GPP, 3rd Generation Partnership Project; Technical Specification Group Radio Access Network; Sidelink resource allocation for FeD2D communication, 3GPP R1-1714001, Aug. 2017, pp. 1-5.

Intel Corporation, Further Considerations on Sidelink Unicast/Groupcast/Broadcast for NR V2X Communication, 3GPP TSG RAN WG1 Meeting #95, R1-1812492, Nov. 12-16, 2018, pp. 1-7, Spokane, USA.

Mediatek Inc., On Sidelink Resource Allocation Mechanism, 3GPP TSG RAN WG1 Meeting #95, R1-1812367, Nov. 12-16, 2018, pp. 1-10, Spokane, USA.

* cited by examiner

METHOD AND APPARATUS FOR SCHEDULING A SIDELINK RESOURCE

TECHNICAL FIELD

The subject application generally relates to sidelink communication, and more specifically to a resources allocation mode during sidelink communication.

BACKGROUND

Device-to-device (D2D) communication is expected to play a prominent role in upcoming cellular networks as it provides ultra-low latency for communication among users. Vehicle to everything (V2X) is introduced into 5G wireless communication technique. D2D is applicable to public safety and commercial communication use-cases, and also to V2X scenario.

In terms of a channel structure of D2D communication, the direct link between two user equipments (UEs) is called a sidelink. Sidelink is an LTE feature introduced in 3GPP (3rd Generation Partnership Project) Release 12, and enables a direct communication between proximal UEs, and data does not need to go through a base station (BS) or core network.

In order to meet the requirements of providing relatively good performance on D2D communication, sidelink, or NR sidelink (e.g. advanced 3GPP NR (New radio) V2X service), communication techniques, e.g. sidelink unicast transmission, sidelink groupcast transmission, sidelink broadcast transmission, or the like, are developed.

SUMMARY

Some embodiments of the subject application provide a method performed by a UE for transmitting data. The method includes: transmitting sidelink control information (SCI), wherein the SCI is used to request a grant of transmitting data, wherein the SCI comprises a recommended resource which can be utilized to transmit the data; receiving another SCI from a UE for scheduling; and transmitting the data corresponding to the received another SCI.

Some embodiments of the subject application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method performed by a UE for transmitting data.

Some embodiments of the subject application provide a method performed by a UE for scheduling. The method includes: receiving SCI from a UE for transmitting data, wherein the SCI is used to request a grant of transmitting the data, and wherein the SCI comprises a recommended resource which can be utilized to transmit the data; and transmitting a another SCI.

Some embodiments of the subject application also provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method performed by a UE for scheduling.

Some embodiments of the subject application provide a method performed by a UE for receiving data. The method includes: either receiving SCI from a UE for transmitting the data or receiving another SCI from a UE for scheduling, wherein the SCI comprises a recommended resource which can be utilized to transmit the data, and the received another SCI comprises a scheduled resource for transmitting the data; and receiving the data.

Some embodiments of the subject application also provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method performed by a UE for receiving data.

BRIEF DESCRIPTION OF THE DRAWINGS

In order to describe the manner in which advantages and features of the subject application can be obtained, a description of the subject application is rendered by reference to specific embodiments thereof which are illustrated in the appended drawings. These drawings depict only example embodiments of the subject application and are not therefore to be considered as limiting of its scope.

DETAILED DESCRIPTION

Figure 1:
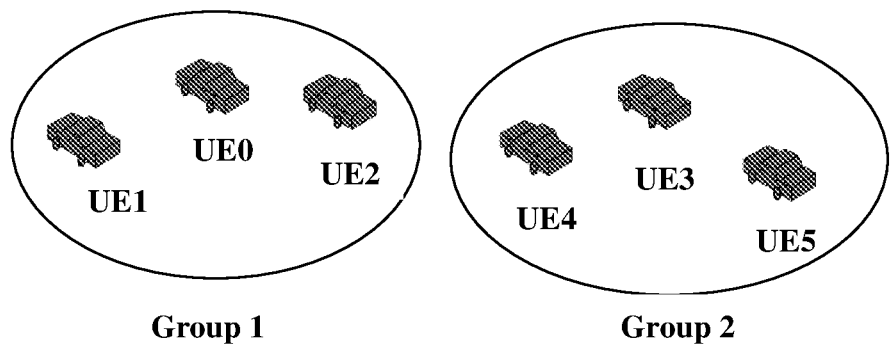
FIG. 1 illustrates an exemplary sidelink communication system in accordance with some embodiments of the subject application.

The detailed description of the appended drawings is intended as a description of the currently preferred embodiments of the subject application, and is not intended to represent the only form in which the subject application may be practiced. It should be understood that the same or equivalent functions may be accomplished by different embodiments that are intended to be encompassed within the spirit and scope of the subject application.

Sidelink (SL) communication includes groupcast communication, unicast communication, or broadcast communication. UE(s) under NR V2X scenario may be referred to as V2X UE(s). Currently, an agreement of 3GPP RAN1 on SL communication was made for supporting several sidelink resource allocation modes for V2X sidelink communication. A sidelink transmission resource(s) may be a time resource, a frequency resource, a code resource, or a combination thereof.

In a sidelink resource allocation mode, a base station (BS) schedules resource(s) for a V2X UE within a SL communication system. In another sidelink resource allocation mode, a V2X UE determines sidelink transmission resource(s) and schedules sidelink transmission resource(s) for other V2X UEs within the SL communication system; and the main difference between this sidelink resource allocation mode and others modes is that a communication resource is scheduled by a V2X UE.

A V2X UE which schedules sidelink transmission resource(s) may be referred to as a UE for scheduling, a scheduling UE, a scheduling V2X UE, a head UE, a head V2X UE, a source UE, a source V2X UE, or like. In order to allocate or assign resource(s), a scheduling UE may determine or select sidelink resource(s) from a resource set, a resource pool, or sidelink resource(s) that are configured or pre-configured by a BS or a network. A scheduling UE may allocate or assign specific sidelink resource(s) for sidelink groupcast communication, sidelink unicast communication, or sidelink broadcast communication.

A V2X UE, which transmits data according to sidelink resource(s) scheduled by a scheduling UE, may be referred to as a UE for transmitting, a transmitting UE, a transmitting V2X UE, a Tx UE, a V2X Tx UE, or like. A V2X UE, which receives data according to sidelink resource(s) scheduled by a scheduling UE, may be referred to as a UE for receiving, a receiving UE, a receiving V2X UE, a Rx UE, a V2X Rx UE, or like. A Tx UE and a Rx UE together may be referred to as a non-scheduling UE, a non-scheduling V2X UE, or like.

In a SL communication system in which a scheduling UE schedules sidelink resource(s), some issues need to be solved: behaviors of a scheduling UE, a signaling transmission mechanism for non-scheduling UEs, and a resources allocation mechanism for non-scheduling UEs.

Some embodiments of the subject application provide a mechanism for scheduling sidelink transmission resource(s). Some embodiments of the subject application provide a mechanism for transmitting data according to scheduled sidelink transmission resource(s). Some embodiments of the subject application provide a mechanism for receiving data according to scheduled sidelink transmission resource(s).

Some embodiments of the subject application provide an apparatus for scheduling sidelink transmission resource(s). Some embodiments of the subject application provide an apparatus for transmitting data according to scheduled sidelink transmission resource(s). Some embodiments of the subject application provide an apparatus for receiving data according to scheduled sidelink transmission resource(s).

Embodiments of the subject application define specific behaviors of a scheduling UE and implement an efficient signaling transmission mechanism and an efficient resources allocation mechanism for non-scheduling UEs. Moreover, embodiments of the subject application reduce a half-duplex issue and save sidelink payloads and resources during sidelink communication.

Embodiments of the subject application may be provided in a network architecture that adopt various service scenarios, for example but is not limited to, 3GPP 5G NR (new radio), 3GPP LTE (Long Term Evolution) Release 12 and onwards, etc.

FIG. 1 illustrates an exemplary sidelink communication system in accordance with some embodiments of the subject application.

Referring to FIG. 1, the sidelink communication system includes some UEs, e.g. UE0, UE1, UE2, UE3, UE4, and UE5. UE0, UE1, UE2, UE3, UE4, and UE5 are configured to perform sidelink groupcast transmission, sidelink unicast transmission, or sidelink broadcast transmission. UEs in a sidelink communication system may form UE group(s) during sidelink communication. As shown in FIG. 1, UE0-UE5 form two UE groups, wherein UE0, UE1, and UE2 form Group 1, and UE3, UE4, and UE5 form Group 2.

It is contemplated that, in accordance with some other embodiments of the subject application, a sidelink communication system may include more or less UEs, a sidelink communication system may include more or less UE groups, and a UE group may include different number of UEs at different time, along with joining and leaving of UE(s) during sidelink communication. Although each of UEs in FIG. 1 is shown in the shape of a car, it is contemplated that a sidelink communication system may include any type of UE (e.g. a roadmap device, a cell phone, a computer, a laptop, IoT (internet of things) device or other type of device) in accordance with some other embodiments of the subject application.

A group of UEs may be configured to perform groupcast transmission. A group of UEs performing groupcast transmission may be referred to as a groupcast group of UEs, a sidelink groupcast group of UEs, a UE groupcast group, or a UE sidelink groupcast group. A source UE within a groupcast group may transmit a groupcast message or a groupcast packet to all member UEs within the same groupcast group. Some or all member UEs may receive the groupcast message (packet) from a source UE. A groupcast message may include groupcast data.

Referring to FIG. 1, each of UE0-UE5 may transmit or receive information or data to any other UE within the sidelink communication system, through sidelink unicast or sidelink broadcast. Each UE in Group 1 or Group 2 may perform sidelink groupcast to other UEs within the same group. In other words, UE0 UE1, and UE2 of Group 1 and UE3, UE4, and UE5 of Group 2 may perform sidelink groupcast transmission within their own group. In each group, a UE would function as a scheduling UE for scheduling the sidelink transmission resource(s). For example, UE0 may function as a scheduling UE within Group 1; UE3 may function as a scheduling UE within Group 2; and each of UE1, UE2, UE4, and UE5 may function as a Tx UE or a Rx UE.

Figure 2:
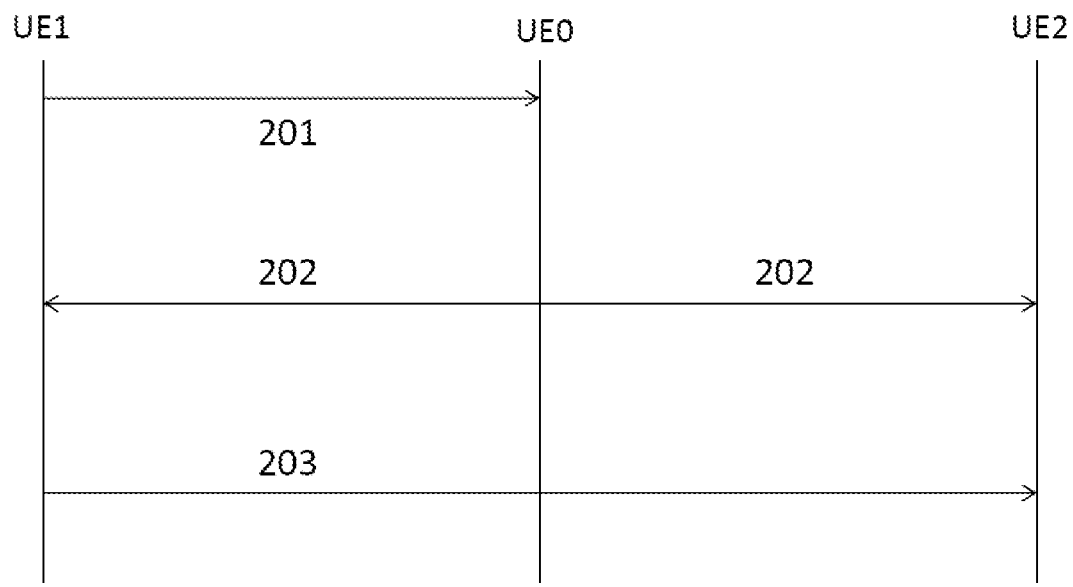
FIG. 2 illustrates an exemplary procedure for sidelink communication transmission in accordance with some embodiments of the subject application.

FIG. 2 illustrates an exemplary procedure for sidelink communication transmission in accordance with some embodiments of the subject application. The sidelink communication transmission implemented in the embodiments of FIG. 2 includes unicast transmission, groupcast transmission, and broadcast transmission. In FIG. 2, UE0 represents a scheduling UE, UE1 represents a Tx UE, and UE2 represents a Rx UE. It is contemplated that, in accordance with some other embodiments of the subject application, names of UEs (which represent a scheduling UE, a Tx UE, and a Rx UE) shown in FIG. 2 may be different, e.g. UE7, UE8, and UE9.

According to the embodiments of FIG. 2, in step 201, UE1 transmits recommended control information (e.g. SCI format) for associated data transmission, through sidelink unicast transmission, sidelink groupcast transmission, or sidelink broadcast transmission. The recommended control information may include recommended resource(s) for the associated data transmission. After receiving the recommended control information, UE0 determines whether to accept the recommended control information or not, and then transmits a corresponding scheduling signaling (e.g. SCI format) in step 202.

In the case that the recommended control information is suitable for data transmission from the perspective of UE0, UE0 accepts the recommended control information and generates scheduling signaling to indicate the recommended resources for data transmission of UE1. The scheduling signaling may include a copy of the recommended resources, to indicate granting the associated data transmission. In the case that the recommended control information is not suitable for data transmission from the perspective of UE0, UE0 does not accept the recommended control information and generates scheduling signaling to indicate other resource(s) for data transmission of UE1.

UE0 may generate a scheduling signaling based on information received from UE1. For example, UE1 transmits a set of available resources in SCI, and UE0 selects one or more resources from the set of available resources as actually scheduled resource(s), and then transmits a scheduling signaling indicating the actually scheduled resource(s). UE1 or UE2 receives the scheduling signaling and knows the resource(s) actually scheduled or assigned by UE0.

The scheduling signaling transmitted in step 202 may be received by both UE1 and UE2. Accordingly, UE1 knows resource(s) actually scheduled by UE0 and will transmit the associated data transmission in step 203; and UE2 knows resource(s) actually scheduled by UE0 for a subsequent data transmission, and will receive the data transmission in the resource(s).

Figure 3:
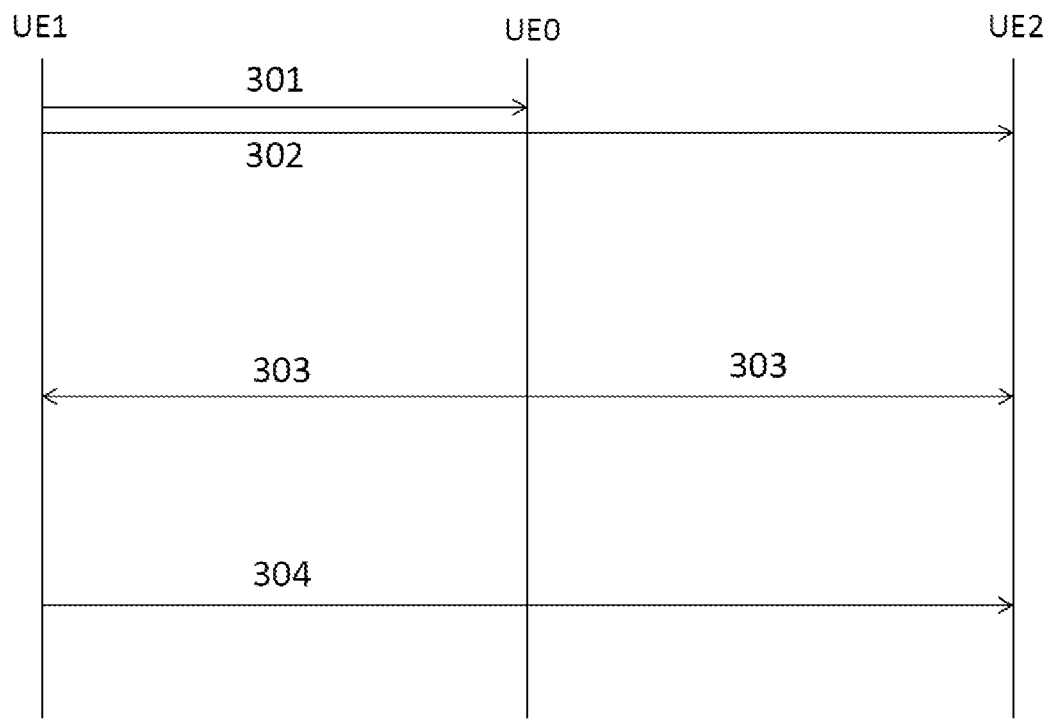
FIG. 3 illustrates another exemplary procedure for sidelink communication transmission in accordance with some embodiments of the subject application.

FIG. 3 illustrates another exemplary procedure for sidelink communication transmission in accordance with some embodiments of the subject application. Similar to FIG. 2, the sidelink communication transmission implemented in the embodiments of FIG. 3 includes unicast, groupcast, and broadcast transmissions, and names of UE0, UE1, and UE2 (which represent a scheduling UE, a Tx UE, and a Rx UE, respectively) shown in FIG. 3 may vary, e.g. UE3, UE4, and UE5.

According to the embodiments of FIG. 3, in step 301, UE1 transmits recommended control information (e.g. SCI format) for associated data transmission to UE0; and in step 302, UE1 transmits the recommended control information to UE2. In another implementation, UE1 transmits recommended control information through sidelink transmission, and both UE0 and UE2 receive the recommended control information in steps 301 and 302. Recommended control information may include recommended resource(s) for the associated data transmission.

In the case that the recommended control information is agreed by UE0, UE0 transmits a confirmation signaling (e.g. SCI format) to both UE1 and UE2 in step 303, in order to grant the content of the recommended control information. The confirmation signaling may be transmitted through sidelink transmission. A confirmation signaling may have a simple format and thus reserve information payload during sidelink communication. For example, a confirmation signaling is one bit indicator, wherein '1' or '0' represents granting the recommended control information.

In the case that the recommended control information is not agreed by UE0, UE0 changes the recommended control information based on its implementation policy and then transmits updated control information (e.g. SCI format) to at least one of UE1 and UE2 in step 303. Updated control information indicates resource(s) actually scheduled or assigned by UE0.

From the perspective of UE1, after receiving a confirmation signaling or updated control information from UE0 in step 303, UE1 transmits associated data in actually scheduled resource(s) in step 304. The associated data may be transmitted to the UE2 through sidelink unicast transmission, sidelink groupcast transmission, or sidelink broadcast transmission.

From the perspective of UE2, after receiving the recommended control information from UE1 in step 302, UE2 knows the resource recommended by UE1 for a subsequent data transmission; after receiving the confirmation signaling or updated control information from UE0 in step 303, UE2 knows the resource(s) actually scheduled or assigned by UE0; and then, UE2 receives the subsequent data transmission in the actually scheduled resource(s) in step 304.

Figure 4:
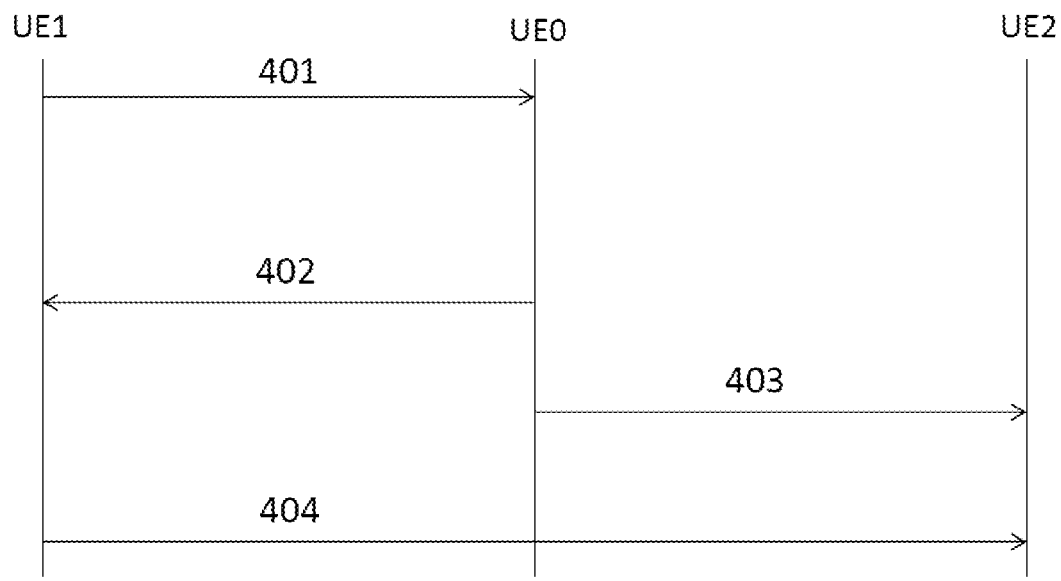
FIG. 4 illustrates another exemplary procedure for sidelink communication transmission in accordance with some embodiments of the subject application.

FIG. 4 illustrates another exemplary procedure for sidelink communication transmission in accordance with some embodiments of the subject application. Similar to FIGS. 2 and 3, the sidelink communication transmission implemented in the embodiments of FIG. 4 includes unicast, groupcast, and broadcast transmissions, and names of UE0, UE1, and UE2 (which represent a scheduling UE, a Tx UE, and a Rx UE, respectively) shown in FIG. 4 may vary, e.g. UE6, UE7, and UE8.

According to the embodiments of FIG. 4, in step 401, UE1 transmits recommended control information (e.g. SCI format) for associated data transmission, through sidelink unicast transmission, sidelink groupcast transmission, or sidelink broadcast transmission. The recommended control information may include recommended resource(s) for the associated data transmission. After receiving the recommended control information in step 401, UE0 determines whether to accept the recommended control information or not, and then transmits a confirmation signaling (e.g. SCI format) or updated control information (e.g. SCI format) in step 402.

From the perspective of UE0, in the case that the recommended control information is suitable for data transmission, UE0 accepts the recommended control information and generates a confirmation signaling to indicate a grant of the recommended resources for data transmission of UE1. In the case that the recommended control information is not suitable for data transmission, UE0 does not accept the recommended control information and generates updated control information, in order to indicate actually scheduled resource(s) for data transmission of UE1.

In step 403, UE0 transmits scheduling signaling (e.g. SCI format) to UE2, in order to notify resource(s) scheduled or assigned for data transmission of UE1. In some embodiments of the subject application, if transmitting a confirmation signaling in step 402, scheduling signaling transmitted in step 403 includes a copy of the recommended resources that are granted by UE0; and if transmitting updated control information in step 402, scheduling signaling transmitted in step 403 includes other resource(s), that are actually scheduled or assigned by UE0, for data transmission of UE1.

From the perspective of UE1, after receiving a confirmation signaling or updated control information from UE0 in step 402, UE1 transmits associated data in actually scheduled resource(s) in step 404. The data is transmitted to UE2 through sidelink unicast transmission, sidelink groupcast transmission, or sidelink broadcast transmission.

From the perspective of UE2, after receiving scheduling signaling transmitted in step 403, UE2 knows the resource(s) actually scheduled or assigned by UE0, and then receives data in the actually scheduled resource(s) in step 404.

In some embodiments of the subject application, a UE requests a grant of transmitting data by transmitting information including a recommended resource. In response to the request, a scheduling UE schedules a sidelink transmission resource for a Tx UE, which may be equal to or different from the recommended resource. The Tx UE then transmits data according to the scheduled sidelink transmission resource, and a Rx UE receives the data transmitted from the Tx UE according to the scheduled sidelink transmission resource.

In some embodiments of the subject application, a Rx UE transmits feedback information regarding the received data to the scheduling UE. The feedback information regarding the received data may be a HARQ feedback, e.g. ACK or NACK. After receiving the feedback information from a Rx UE, the scheduling UE schedules a re-transmission of the data from the Tx UE, in order to enhance transmission reliability and efficiency. In some embodiments of the subject application, a Rx UE transmits feedback information regarding the received data to the Tx UE. After receiving the feedback information from the Rx UE, the Tx UE performs a re-transmission of the data.

According to some embodiments of the subject application, a scheduling UE is pre-configured by a base station (BS) based on a geographical location. In particular, a BS (e.g. gNB) pre-configures a specific scheduling UE for each UE group in a SL communication system, and transmits configuring information regarding the specific scheduling UE to all UEs. Accordingly, each UE in the SL communication system knows the information regarding the specific scheduling UE of each UE group. The information regarding the specific scheduling UE of each UE group may include mapping information between identifying information (e.g. an identification (ID)) of a scheduling UE, a geographical location of the scheduling UE, a geographical coverage rang of the scheduling UE, a geographical range of the UE group, or a combination thereof. Based on the mapping information, when a UE is located in a geographical range, the UE may identify concrete information related to a scheduling UE of a UE group in the geographical range. In other words, based on a current or actual geographical location of a UE, the UE may determine or know a scheduling UE from information pre-configured by a BS.

For instance, in the case that a UE (a Tx UE or a Rx UE) approaches or enters into a geographical coverage rang of the scheduling UE or a geographical range of a UE group, the UE may retrieve mapping information regarding a scheduling UE of each UE group, and then identifies, based on a current geographical location of the UE, the UE which functions as a scheduling UE within this UE group. After identifying the scheduling UE, a UE may act as a non-scheduling UE and perform data transmission or reception based on scheduling instructions or results from the identified scheduling UE. In a SL groupcast transmission system, after identifying the scheduling UE in a UE groupcast group, a UE may act as a non-scheduling UE and perform groupcast data transmission or reception within the UE groupcast group based on scheduling instructions or results from the scheduling UE.

According to some embodiments of the subject application, a scheduling UE is configured by a BS via a control signaling based on a geographical location. In particular, in the case that a UE (e.g. a Tx UE or a Rx UE) approaches or enters into a geographical range of a UE group, a BS (e.g. gNB) may transmit information regarding a scheduling UE of this UE group via Radio Resource Control (RRC) signaling to the UE; then, the UE knows the information regarding the scheduling UE and may perform communication with the scheduling UE. More specifically, after determining (e.g. measuring) the current geographical location of a UE, the BS may transmit a signaling including identifying information of a scheduling UE (e.g. a scheduling UE ID) to the UE. After receiving the signaling, the UE may act as a non-scheduling UE, communicate with the scheduling UE, and perform data transmission or reception based on subsequent scheduling instructions or results from the scheduling UE.

According to some embodiments of the subject application, in a SL communication system, a scheduling UE and a non-scheduling UE may transmit control information to each other. Such control information may be referred to as sidelink control information (SCI) or like. SCI may be transmitted in Physical Sidelink Control Channel (PSCCH), Physical Sidelink Feedback Channel (PSFCH), or a combination thereof.

In some embodiments of the subject application, SCI is transmitted between UEs, in order to request or indicate sidelink transmission resource(s) for a subsequent data transmission between the UEs. SCI may include, but not limited to, a scheduling request (SR), resource requirement regarding data transmission, an available resources set, a time offset indication, a scheduling grant or confirmation, channel state or quality information, power adjusting information, or a combination thereof.

In some embodiments of the subject application, SR in SCI includes identification indication, for indicating whether the SCI is transmitted by a scheduling UE a non-scheduling UE. The identification indication may be UE ID information. For instance, SCI carries scheduling UE ID information or non-scheduling UE ID information. Alternatively, SCI is scrambled by scheduling UE ID information or non-scheduling UE ID information.

In some embodiments of the subject application, SR in SCI includes a transmission request indication field, in order to represent that the SCI is transmitted from a non-scheduling UE or a scheduling UE. A transmission request indication may be one bit indicator, wherein '0' represents the SCI being transmitted for non-scheduling UE, and '1' represents the SCI being transmitted from scheduling UE, or vice versa. A transmission request indication may include ID information of a UE which sends the SCI, e.g. a scheduling UE ID. A scheduling UE ID may be configured or pre-configured by a BS.

In some embodiments of the subject application, resource requirement regarding data transmission in SCI includes a buffer size report (BSR), a sidelink resource (e.g. time-frequency resource) required for transmitting data, a recommended modulation and coding scheme (MCS), channel state information (CSI), or a combination thereof. For example, a Tx UE sends SCI including resource(s) required for data transmission or a recommended MCS. After receiving such SCI from the Tx UE, a scheduling UE may determine actual resource allocation solution for the data transmission and then transmit a scheduling signaling to the Tx UE. The scheduling signaling indicates the actual resource allocation and may have different formats, as described in the following text.

In some embodiments of the subject application, an available resources set in SCI includes one or more available resources (e.g. time-frequency available resources) based on a sensing result of a Tx UE which intends to transmit data. For example, a Tx UE performs a sensing operation on a resource pool to obtain available resources.

In some embodiments of the subject application, a time offset indication in SCI includes time offset(s) between different timeslots transmitting SCI or data. For example, SCI includes a time offset between a timeslot where a Tx UE transmitting the SCI and a timeslot where a Tx UE transmitting data. A scheduling UE may further transmit another SCI to a Tx UE or a Rx UE. Thus, SCI may include a time offset between a timeslot where a Tx UE transmitting the SCI and a timeslot where a scheduling UE transmitting the abovementioned another SCI to the Tx UE, or a time offset between a timeslot where a Tx UE transmitting the SCI and a timeslot where a scheduling UE transmitting the abovementioned another SCI to a Rx UE.

Figure 5:
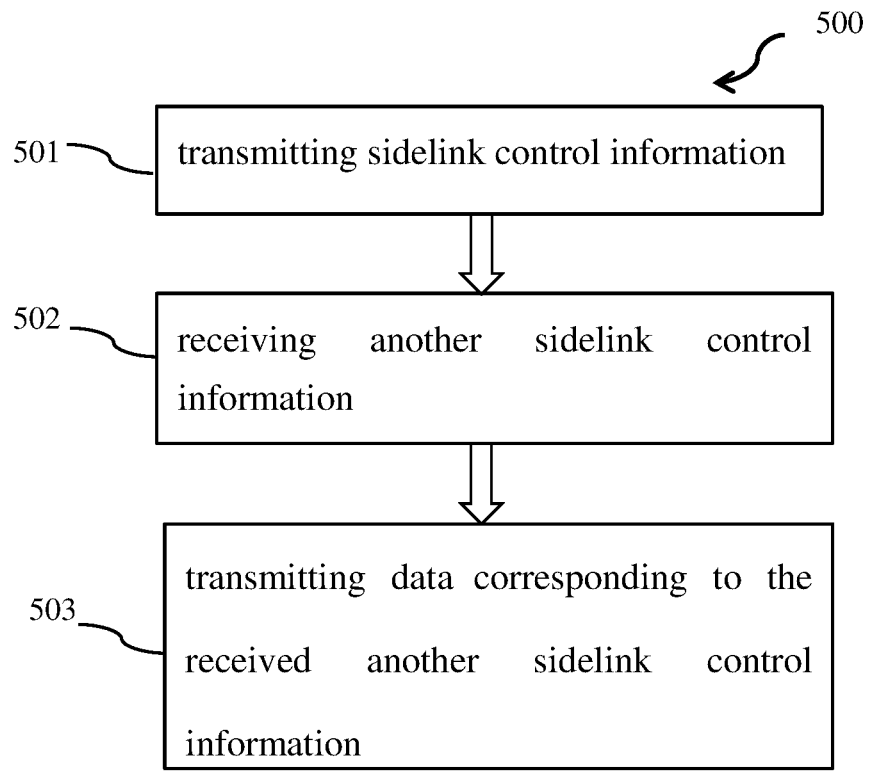
FIG. 5 illustrates a flow chart of a method for transmitting data in accordance with some embodiments of the subject application.

FIG. 5 illustrates a flow chart of a method for transmitting data in accordance with some embodiments of the subject application. Referring to FIG. 5, method 500 is performed by a Tx UE (e.g. UE1, UE2, UE4, or UE5 as illustrated and described with reference to FIG. 1) in some embodiments of the subject application. In operation 501, a Tx UE (e.g. UE1 as shown in FIG. 1) transmits sidelink control information (SCI). In operation 502, the Tx UE receives another SCI. In operation 503, the Tx UE transmits data corresponding to the received another SCI.

In particular, a Tx UE transmits SCI in operation 501 to request a grant of a subsequent data transmission. The SCI may include a recommended resource which can be utilized to carry the subsequent data transmission. After receiving the SCI from the Tx UE, a scheduling UE transmits another SCI to the Tx UE in operation 502. Then, the Tx UE performs the subsequent data transmission in operation 503, based on a scheduled result of the scheduling UE, wherein the scheduled result is included in the abovementioned another SCI.

All descriptions related to SCI in the subject application are applicable for the SCI transmitted in the flow chart of FIG. 5. In some embodiments of the subject application, SCI transmitted by a Tx UE includes a SR, a resource requirement for the data, an available resources set, a time offset indication, or a combination of two or more of the above.

In some embodiments of the subject application, if a scheduling UE grants the recommended resource in the SCI in operation 501, the transmitted another SCI includes information of granting a subsequent data transmission; alternatively, the transmitted another SCI includes information indicating a scheduled resource that is equal to the recommended resource for a subsequent data transmission. If the scheduling UE does not grant the recommended resource, the transmitted another SCI includes a scheduled resource different from the recommended resource for the subsequent data transmission. In some embodiments of the subject application, the scheduling UE further transmits power adjusting information in the transmitted another SCI to adjust the power of a Tx UE transmitting data.

Figure 6:
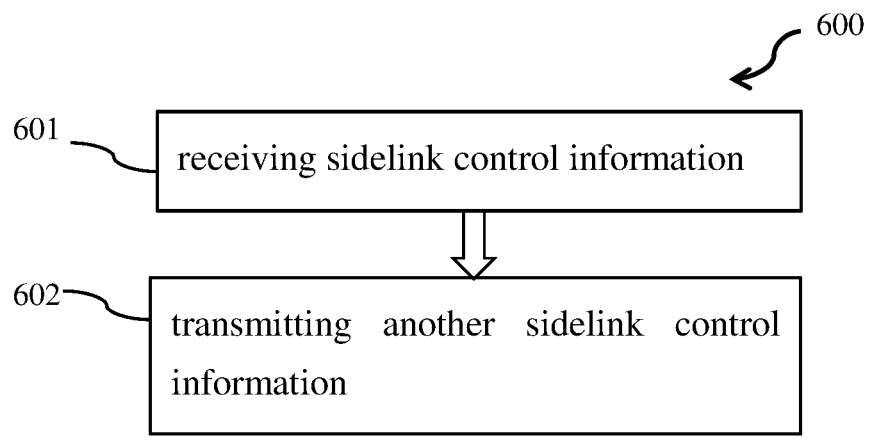
FIG. 6 illustrates a flow chart of a method for scheduling resource in accordance with some embodiments of the subject application.

FIG. 6 illustrates a flow chart of a method for scheduling resource in accordance with some embodiments of the subject application. Referring to FIG. 6, method 600 is performed by a scheduling UE (e.g. UE0, or UE3 as illustrated and described with reference to FIG. 1) in accordance with some embodiments of the subject application. A scheduling UE (e.g. UE0 as shown in FIG. 1) receives SCI in operation 601 and transmits another SCI in operation 602.

In particular, a Tx UE transmits SCI to request a grant of a data transmission. A scheduling UE receives the SCI and determines whether to grant the data transmission. Then, the scheduling UE transmits another SCI to the Tx UE, to notify a result of whether granting data transmission. The scheduling UE may transmit another SCI to a Rx UE to notify information related to the data transmission, such that the Rx UE will receive the data transmission. All descriptions related to SCI in the subject application are applicable for the SCI and the abovementioned another SCI transmitted in the flow chart of FIG. 6.

Figure 7:
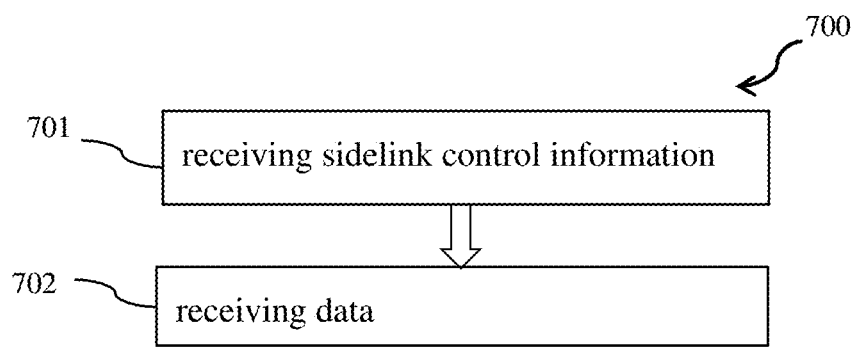
FIG. 7 illustrates a flow chart of a method for receiving data in accordance with some embodiments of the subject application.

FIG. 7 illustrates a flow chart of a method for receiving data in accordance with some embodiments of the subject application. Referring to FIG. 7, method 700 is performed by a Rx UE (e.g. UE1, UE2, UE4, or UE5 as illustrated and described with reference to FIG. 1) in accordance with some embodiments of the subject application. A Rx UE (e.g. UE2 as shown in FIG. 1) receives SCI in operation 701, and then receives data corresponding to the received SCI in operation 702. All descriptions related to SCI in the subject application are applicable for the SCI and the abovementioned another SCI transmitted in the flow chart of FIG. 7.

In some embodiments of the subject application, a Rx UE receives SCI from a Tx UE which transmits data, wherein the SCI includes a recommended resource which can be utilized to transmit the data. Then, the Rx UE receives confirmation information or granting information from a scheduling UE. Accordingly, the Rx UE knows that the recommended resource is granted by the scheduling UE and will be utilized to transmit the data, and will receive the data in the recommended resource. In some embodiments of the subject application, a scheduling UE does not send confirmation information or granting information, but sends another SCI including an actually scheduled resource for transmitting data. After receiving such SCI from a scheduling UE, a Rx UE will receive the data in the actually scheduled resource.

Figure 8:
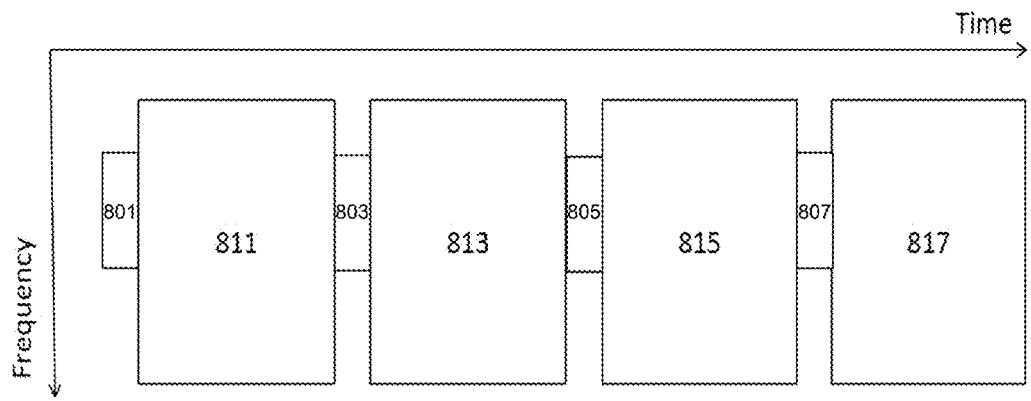
FIG. 8 illustrates an exemplary structure of sidelink communication transmission in accordance with some embodiments of the subject application.

FIG. 8 illustrates an exemplary structure of sidelink communication transmission in accordance with some embodiments of the subject application. FIG. 8 shows a resource diagram, wherein block 801, block 803, block 805, and block 807 represent sidelink resources used for SCI transmission, respectively; and block 811, block 813, block 815, and block 817 represent sidelink resources used for data transmission, respectively. It is contemplated that, in accordance with some other embodiments of the subject application, numbers of each block shown in FIG. 8 may vary, and a resource location of each block in the whole resource diagram shown in FIG. 8 may vary.

According to the embodiments of FIG. 8, sidelink resources are time-frequency resources. SCI transmission and data transmission in FIG. 8 use different time resources and different frequency resources. For example, block 801 is in Timeslot 1; block 811 is in Timeslot 2; block 803 is in Timeslot 3; block 813 is in Timeslot 4; block 805 is in Timeslot 5; block 815 is in Timeslot 6; block 807 is in Timeslot 7; and block 817 is in Timeslot 8. For example, block 801 and block 811 are in different frequency resources, block 803 and block 813 are in different frequency resources, block 805 and block 815 are in different frequency resources, and block 807 and block 817 are in different frequency resources.

Please refer to FIG. 2 along with FIG. 8. In some embodiments of the subject application, a Tx UE transmits SCI to a scheduling UE at block 801 (e.g. Timeslot 1), to request a grant of data transmission. After receiving the SCI from the Tx UE, a scheduling UE transmits another SCI at block 805 (e.g. Timeslot 5), as a confirmation signaling or a scheduling signaling for associated data transmission. The abovementioned another SCI may be received by both the Tx UE and a Rx UE. The confirmation signaling grants recommended control information in the SCI transmitted by the Tx UE. The scheduling information includes resource(s) actually scheduled or assigned by the scheduling UE, e.g., block 817 (e.g. Timeslot 8). Upon reception of the abovementioned another SCI, the Tx UE transmits data following the confirmation signaling or the scheduling information. For example, according to the confirmation signaling or the scheduling information received at block 805, the Tx UE transmits data at block 817. A Rx UE receives the abovementioned another SCI from the scheduling UE at block 805, and will receive and decode the data at block 817.

The SCI transmitted at block 801 may include a time offset indication, for indicating a time offset between a timeslot where a Tx UE transmitting the SCI and a timeslot where a Tx UE transmitting data. For example, a time offset between Timeslot 1 (i.e. block 801) and Timeslot 8 (i.e. block 817) is 7, and thus a time offset indication in the SCI transmitted at block 801 represents 7.

A time offset indication in the SCI transmitted at block 801 may indicate a time offset between a timeslot where a Tx UE transmitting the SCI and a timeslot where a scheduling UE transmitting the abovementioned another SCI to the Tx UE. For example, a time offset between Timeslot 1 (i.e. block 801) and Timeslot 5 (i.e. block 805) is 4, and thus a time offset indication in the SCI transmitted at block 801 represents 4.

A time offset indication in the SCI transmitted at block 801 may indicate a time offset between a timeslot where a Tx UE transmitting the SCI and a timeslot where a scheduling UE transmitting the abovementioned another SCI to a Rx UE. For example, a time offset between Timeslot 1 (i.e. block 801) and Timeslot 5 (i.e. block 805) is 4, and thus a time offset indication in the SCI transmitted at block 801 represents 4.

In some embodiments of FIG. 8, a time offset between SCI transmission and data transmission is not indicated in a time offset indication in SCI, but is configured or pre-configured by a scheduling UE or a BS.

Figure 9:
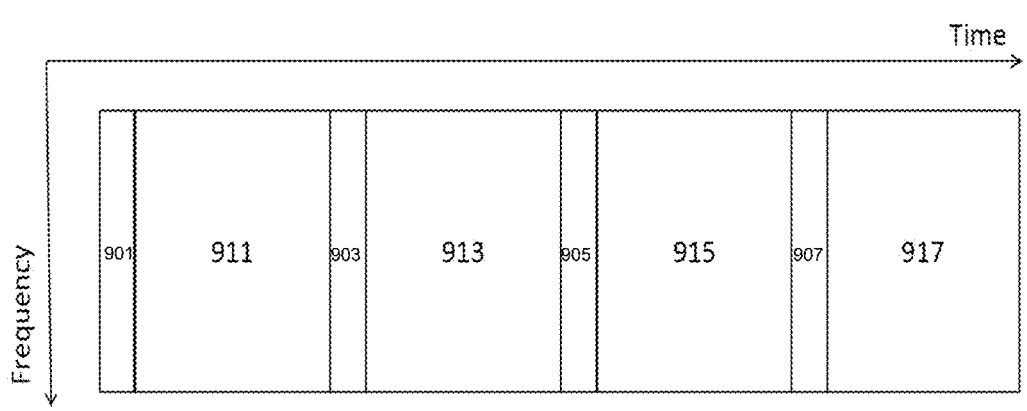
FIG. 9 illustrates another exemplary structure of sidelink communication transmission in accordance with some embodiments of the subject application.

FIG. 9 illustrates another exemplary structure of sidelink communication transmission in accordance with some embodiments of the subject application. Similar to FIG. 8, FIG. 9 shows a resource diagram, wherein block 901, block 903, block 905, and block 907 represent sidelink resources used for SCI transmission, respectively; block 911, block 913, block 915, and block 917 represent sidelink resources used for data transmission, respectively; numbers of each block shown in FIG. 9 may vary; and a resource location of each block in the whole resource diagram shown in FIG. 9 may vary.

According to the embodiments of FIG. 9, sidelink resources are time-frequency resources, wherein SCI transmission and data transmission in FIG. 9 use the same frequency resources, but use different time resources. For example, block 901 is in Timeslot 1; block 911 is in Timeslot 2; block 903 is in Timeslot 3; block 913 is in Timeslot 4; block 905 is in Timeslot 5; block 915 is in Timeslot 6; block 907 is in Timeslot 7; and block 917 is in Timeslot 8. For example, all of block 901, block 911, block 903, block 913, block 905, block 915, block 907, and block 917 are in the same frequency resources.

Please refer to FIG. 3 along with FIG. 9. In some embodiments of the subject application, a Tx UE transmits SCI to both a scheduling UE and a Rx UE at block 901 (e.g. Timeslot 1). After receiving the SCI from the Tx UE, a scheduling UE transmits another SCI at block 903 (e.g. Timeslot 3), as a confirmation signaling or a scheduling signaling for a data transmission of the Tx UE. The abovementioned another SCI may be received by both the Tx UE and a Rx UE. The confirmation signaling grants recommended control information in the SCI transmitted by the Tx UE. The scheduling information includes resource(s) actually scheduled or assigned by the scheduling UE, e.g., block 915 (e.g. Timeslot 6). Upon reception of the abovementioned another SCI, the Tx UE transmits data following the confirmation signaling or the scheduling information. For example, according to the confirmation signaling or the scheduling information received at block 903, the Tx UE transmits data at block 915. A Rx UE receives the abovementioned another SCI from the scheduling UE at block 915, and will receive and decode the data at block 915.

The SCI transmitted at block 901 may include a time offset indication, for indicating a time offset between a timeslot where a Tx UE transmitting the SCI and a timeslot where a Tx UE transmitting data. For example, a time offset between Timeslot 1 (i.e. block 901) and Timeslot 6 (i.e. block 915) is 5, and thus a time offset indication in the SCI transmitted at block 901 represents 5.

A time offset indication in the SCI transmitted at block 901 may indicate a time offset between a timeslot where a Tx UE transmitting the SCI and a timeslot where a scheduling UE transmitting the abovementioned another SCI to the Tx UE. For example, a time offset between Timeslot 1 (i.e. block 901) and Timeslot 3 (i.e. block 903) is 2, and thus a time offset indication in the SCI transmitted at block 901 represents 2.

A time offset indication in the SCI transmitted at block 901 may indicate a time offset between a timeslot where a Tx UE transmitting the SCI and a timeslot where a scheduling UE transmitting the abovementioned another SCI to a Rx UE. For example, a time offset between Timeslot 1 (i.e. block 901) and Timeslot 3 (i.e. block 803) is 2, and thus a time offset indication in the SCI transmitted at block 901 represents 2.

In some embodiments of FIG. 9, a time offset between SCI transmission and data transmission is not indicated in a time offset indication in SCI, but is configured or pre-configured by a scheduling UE or a BS.

Figure 10:
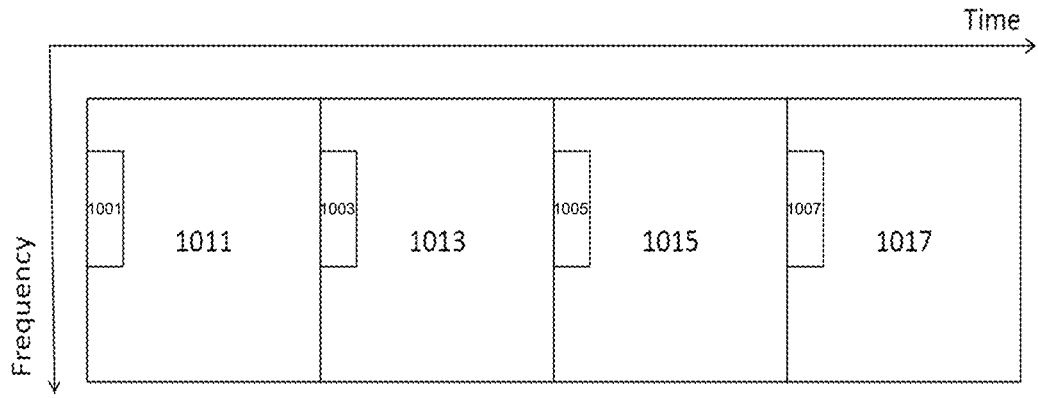
FIG. 10 illustrates another exemplary structure of sidelink communication transmission in accordance with some embodiments of the subject application.

FIG. 10 illustrates another exemplary structure of sidelink communication transmission in accordance with some embodiments of the subject application. Similar to FIGS. 8 and 9, FIG. 10 shows a resource diagram, wherein block 1001, block 1003, block 1005, and block 1007 represent sidelink resources used for SCI transmission, respectively; block 1011, block 1013, block 1015, and block 1017 represent sidelink resources used for data transmission, respectively; numbers of each block shown in FIG. 10 may vary; and a resource location of each block in the whole resource diagram shown in FIG. 10 may vary.

According to the embodiments of FIG. 10, sidelink resources are time-frequency resources, wherein SCI transmission and data transmission in FIG. 10 use the same time resources, but use different frequency resources. For example, block 1001 and block 1011 are in Timeslot 1; block 1003 and block 1013 are in Timeslot 2; block 1005 and block 1015 are in Timeslot 3; and block 1007 and block 1017 are in Timeslot 4. For example, block 1001 and block 1011 are in different frequency resources, block 1003 and block 1013 are in different frequency resources, block 1005 and block 1015 are in different frequency resources, and block 1007 and block 1017 are in different frequency resources.

Please refer to FIG. 4 along with FIG. 10. In some embodiments of the subject application, a Tx UE transmits SCI to a scheduling UE at block 1001 (e.g. Timeslot 1). After receiving the SCI from the Tx UE, a scheduling UE transmits another SCI at block 1005 (e.g. Timeslot 3), as a confirmation signaling or a scheduling signaling for a data transmission of the Tx UE. The confirmation signaling grants recommended control information in the SCI transmitted by the Tx UE. The scheduling information includes resource(s) actually scheduled or assigned by the scheduling UE, e.g., block 1017 (e.g. Timeslot 4). Upon reception of the abovementioned another SCI, the Tx UE transmits data following the confirmation signaling or the scheduling information. For example, according to the confirmation signaling or the scheduling information received at block 1005, the Tx UE transmits data at block 1017. The scheduling UE transmits a further SCI to a Rx UE at block 1007 (e.g. Timeslot 4), as a scheduling signaling regarding a data transmission of the Tx UE. The Rx UE receives the abovementioned further SCI from the scheduling UE at block 1007, and will receive and decode the data transmitted at block 1017.

The SCI transmitted at block 1001 may include a time offset indication, for indicating a time offset between a timeslot where a Tx UE transmitting the SCI and a timeslot where a Tx UE transmitting data. For example, a time offset between Timeslot 1 (i.e. block 1001) and Timeslot 4 (i.e. block 1017) is 3, and thus a time offset indication in the SCI transmitted at block 1001 represents 3.

A time offset indication in the SCI transmitted at block 901 may indicate a time offset between a timeslot where a Tx UE transmitting the SCI and a timeslot where a scheduling UE transmitting the abovementioned another SCI to the Tx UE. For example, a time offset between Timeslot 1 (i.e. block 1001) and Timeslot 3 (i.e. block 1005) is 2, and thus a time offset indication in the SCI transmitted at block 1001 represents 2.

A time offset indication in the SCI transmitted at block 901 may indicate a time offset between a timeslot where a Tx UE transmitting the SCI and a timeslot where a scheduling UE transmitting the abovementioned another SCI to a Rx UE. For example, a time offset between Timeslot 1 (i.e. block 1001) and Timeslot 4 (i.e. block 1007) is 3, and thus a time offset indication in the SCI transmitted at block 1001 represents 3.

In some embodiments of FIG. 10, a time offset between SCI transmission and data transmission is not indicated in a time offset indication in SCI, but is configured or pre-configured by a scheduling UE or a BS.

Figure 11:
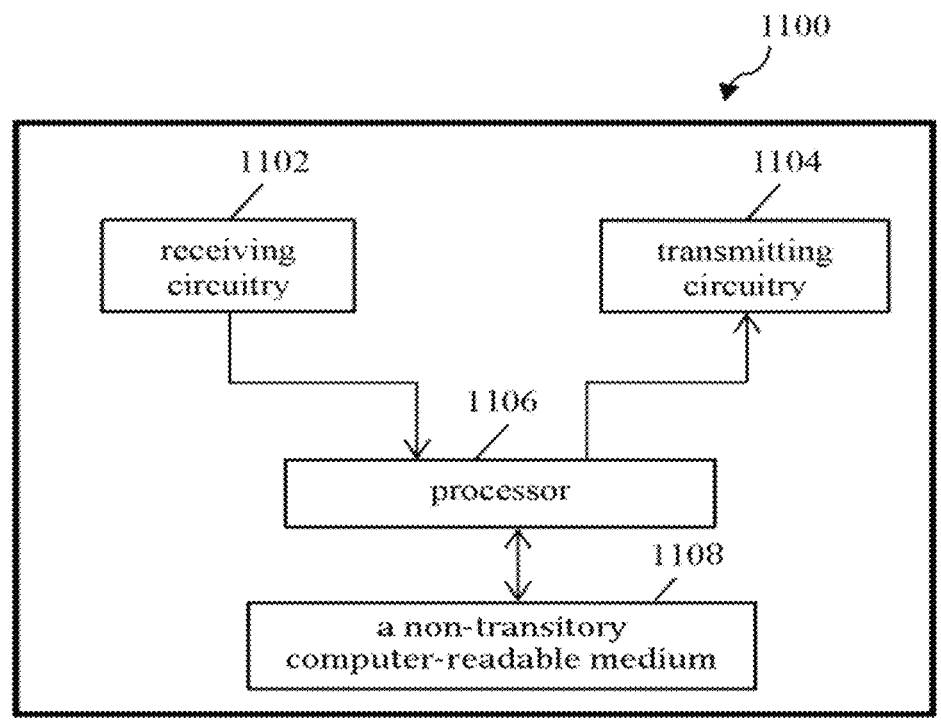
FIG. 11 illustrates a block diagram of an exemplary apparatus in accordance with some embodiments of the subject application.

FIG. 11 illustrates a block diagram of an exemplary apparatus in accordance with some embodiments of the subject application. Referring to FIG. 11, the apparatus 1100 include a non-transitory computer-readable medium 1108, a receiving circuitry 1102, a transmitting circuitry 1104, and a processor 1106 coupled to the non-transitory computer-readable medium 1108, the receiving circuitry, and the transmitting circuitry. The apparatus 1100 may include a UE, a source UE, a member UE, a V2X UE or other device that supports D2D communication or sidelink transmission.

It is contemplated that some components are omitted in FIG. 11 for simplicity. In some embodiments, the receiving circuitry 1102 and the transmitting circuitry 1104 may be integrated into a single component (e.g. a transceiver).

In some embodiments, the non-transitory computer-readable medium 1108 may have stored thereon computer-executable instructions to cause a processor to implement the operations with respect to the UE(s) as described above. For example, the computer-executable instructions may be executed to cause the processor 1106 to control the receiving circuitry 1102 and transmitting circuitry 1104 to perform the operations with respect to the UE(s) as described and illustrated with respect to FIGS. 2-10.

The method of the subject application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the subject application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment UE, the method comprising:

transmitting, from the UE to a second UE prior to transmitting data, first sidelink control information comprising a recommended resource that the UE is to use to transmit the data, wherein the first sidelink control information is used to request a grant for transmitting the data from the UE;

receiving, at the UE, second sidelink control information from the second UE for scheduling the data to be transmitted from the UE, wherein the second sidelink control information comprises an actual resource that the UE is to use to transmit the data, and the actual resource is determined based on the recommended resource; and transmitting, from the UE to the second UE, the data using the actual resource corresponding to the second sidelink control information.

2. The method of claim 1, wherein the UE for scheduling is pre-configured by a base station based on a geographical location.

3. The method of claim 1, wherein the UE for scheduling is configured by a base station via radio resource control signaling based on a geographical location.

4. The method of claim 1, wherein the first sidelink control information is transmitted to the UE for scheduling.

5. The method of claim 1, wherein if the recommended resource is granted by the second UE, the second sidelink control information comprises information of granting transmitting the data; and if the recommended resource is not granted by the second UE, the second sidelink control information comprises a scheduled resource different from the recommended resource for transmitting the data.

6. The method of claim 1, wherein the second sidelink control information comprises information indicating a scheduled resource for transmitting the data, and the scheduled resource can be equal to or different from the recommended resource.

7. The method of claim 1, wherein the second sidelink control information comprises power adjusting information.

8. The method of claim 1, wherein the first sidelink control information comprises a scheduling request, a resource requirement for the data, an available resources set, a time offset indication, or a combination of two or more of the above.

9. The method of claim 8, wherein the resource requirement for the data comprises a buffer size report, a time-frequency resource required for transmitting the data, a recommended modulation and coding scheme, channel state information, or a combination of two or more of the above.

10. The method of claim 8, wherein the scheduling request comprises indication indicating whether the first sidelink control information is transmitted by second UE.

11. The method of claim 10, wherein the indication is UE identification information.

12. The method of claim 8, wherein the available resources set comprises one or more time-frequency available resources based on a sensing result of the UE for transmitting the data.

13. The method of claim 8, wherein the time offset indication comprises at least one of:

a time offset between a timeslot transmitting the first sidelink control information and a timeslot transmitting the data;

a time offset between the timeslot transmitting the first sidelink control information and a timeslot transmitting the second sidelink control information; and a time offset between the timeslot transmitting the first sidelink control information and a timeslot transmitting a third sidelink control information.

14. A method performed by a second user equipment (UE), the method comprising:

receiving, at the second UE from the UE prior to receiving data, first sidelink control information comprising a recommended resource that the UE is to use to transmit the data, wherein the first sidelink control information is used to request a grant for transmitting the data from the UE;

transmitting, to the UE, a second sidelink control information from the second UE for scheduling the data to be transmitted from the UE, wherein the second sidelink control information comprises an actual resource that the UE is to use to transmit the data, and the actual resource is determined based on the recommended resource; and receiving, at the second UE from the UE, the data using the actual resource corresponding to the second sidelink control information.

15. The method of claim 14, wherein the second UE is pre-configured by a base station based on a geographical location.

16. The method of claim 14, wherein the second UE is configured by a base station via radio resource control signaling based on a geographical location.

17. The method of claim 14, wherein if the recommended resource is granted by the second UE, the second sidelink control information comprises information of granting transmitting the data; and if the recommended resource is not granted by the second UE, the second sidelink control information comprises a scheduled resource different from the recommended resource for transmitting the data.

18. The method of claim 14, wherein the second sidelink control information comprises information indicating a scheduled resource for transmitting the data, and the scheduled resource can be equal to or different from the recommended resource.

19. A user equipment UE, comprising:

at least one memory; and at least one processor coupled with the at least one memory and configured to cause the UE to:

transmit, from the UE to a second UE prior to transmitting data, first sidelink control information comprising a recommended resource that the UE is to use to transmit the data, wherein the first sidelink control information is used to request a grant for transmitting the data from the UE;

receive, at the UE, second sidelink control information from the second UE for scheduling the data to be transmitted from the UE, wherein the second sidelink control information comprises an actual resource that the UE is to use to transmit the data, and the actual resource is determined based on the recommended resource; and transmit, from the UE to the second UE, the data using the actual resource corresponding to the second sidelink control information.

20. A second user equipment (UE), comprising:

at least one memory; and at least one processor coupled with the at least one memory and configured to cause the second UE to:

receive, at the second UE from the UE prior to receiving data, first sidelink control information comprising a recommended resource that the UE is to use to transmit the data, wherein the first sidelink control information is used to request a grant for transmitting the data from the UE; and transmit, to the UE, a second sidelink control information from the second UE for scheduling the data to be transmitted from the UE, wherein the second sidelink control information comprises an actual resource that the UE is to use to transmit the data, and the actual resource is determined based on the recommended resource; and receive, at the second UE from the UE, the data using the actual resource corresponding to the second sidelink control information.

* * * * *